United States Patent
Song et al.

(10) Patent No.: US 12,474,615 B2
(45) Date of Patent: Nov. 18, 2025

(54) ELECTRONIC DEVICE INCLUDING ELECTROCHROMIC DEVICE AND METHOD OF CONTROLLING THE ELECTRONIC DEVICE

(71) Applicant: SAMSUNG ELECTRONICS CO., LTD., Suwon-si (KR)

(72) Inventors: Doukyoung Song, Suwon-si (KR); Byounghee Lee, Suwon-si (KR); Chulkwi Kim, Suwon-si (KR); Jina Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 611 days.

(21) Appl. No.: 17/939,371

(22) Filed: Sep. 7, 2022

(65) Prior Publication Data

US 2023/0089234 A1 Mar. 23, 2023

Related U.S. Application Data

(63) Continuation of application No. PCT/KR2022/011203, filed on Jul. 29, 2022.

(30) Foreign Application Priority Data

Sep. 17, 2021 (KR) .................. 10-2021-0125188

(51) Int. Cl.
*G02F 1/163* (2006.01)
*G02B 27/01* (2006.01)

(52) U.S. Cl.
CPC ......... *G02F 1/163* (2013.01); *G02B 27/0172* (2013.01); *G02B 2027/0138* (2013.01); *G02B 2027/014* (2013.01); *G02B 2027/0178* (2013.01)

(58) Field of Classification Search
CPC .................................................. G02B 27/0172
See application file for complete search history.

(56) References Cited

U.S. PATENT DOCUMENTS

2004/0196371 A1* 10/2004 Kono .............. H04N 23/11
348/E5.025
2014/0099005 A1* 4/2014 Mogi ............... G06V 40/172
382/118

(Continued)

FOREIGN PATENT DOCUMENTS

JP 2014-027597 2/2014
KR 10-1162264 7/2012

(Continued)

OTHER PUBLICATIONS

Search Report dated Oct. 28, 2022 issued in International Patent Application No. PCT/KR2022/011203.

*Primary Examiner* — Nan-Ying Yang
(74) *Attorney, Agent, or Firm* — Nixon & Vanderhye P.C.

(57) ABSTRACT

Disclosed is an electronic device including an electrochromic device and a method of controlling the electronic device. The method includes: acquiring a first image frame using a camera of the electronic device, turning off an infrared (IR) lighting of the electronic device based on the IR lighting being on; acquiring a second image frame using the camera while the IR lighting is off; and controlling a transmittance of the electrochromic device based on a brightness of the second image frame based on the first image frame being acquired with the IR lighting on.

17 Claims, 8 Drawing Sheets

(56) References Cited

U.S. PATENT DOCUMENTS

2019/0204703 A1     7/2019  Giri
2020/0221037 A1*    7/2020  Lu  ........................... H04N 9/77

FOREIGN PATENT DOCUMENTS

| KR | 10-2015-0057122 | 5/2015 | | |
| KR | 10-2016-0059815 | 5/2016 | | |
| KR | 10-2016-0103675 | 9/2016 | | |
| KR | 10-2017-0115367 | 10/2017 | | |
| KR | 2017115367 A | * 10/2017 | ............... | G02B 5/23 |
| KR | 10-2211642 | 2/2021 | | |
| KR | 10-2246111 | 4/2021 | | |
| WO | 2017/149608 | 9/2017 | | |

\* cited by examiner

ELECTRONIC DEVICE INCLUDING ELECTROCHROMIC DEVICE AND METHOD OF CONTROLLING THE ELECTRONIC DEVICE

CROSS-REFERENCE TO RELATED APPLICATIONS

This application is a continuation of International Application No. PCT/KR2022/011203 designating the United States, filed on Jul. 29, 2022, in the Korean Intellectual Property Receiving Office and claiming priority to Korean Patent Application No. 10-2021-0125188 filed on Sep. 17, 2021, in the Korean Intellectual Property Office, the disclosures of which are incorporated by reference herein in their entireties.

BACKGROUND

1. Field

The disclosure relates to an electronic device including an electrochromic device and a method of controlling the electronic device.

2. Description of Related Art

Electrochromism refers to a phenomenon in which color changes reversibly depending on an applied voltage and may be used to control a transmittance of an electrochromic device.

The electrochromic device may be used as a lens of an electronic device, such as, for example, augmented reality (AR) glasses. The electronic device may sense an ambient brightness using an illuminance sensor and control the transmittance of the electrochromic device based on the ambient brightness.

An electronic device (e.g., augmented reality (AR) glasses) including an electrochromic device may need to identify an ambient brightness to control a transmittance of the electrochromic device so as to prevent and/or reduce eyes of a user from experiencing glares.

The electronic device may include a camera configured to acquire an image to be used to track hands and a head of a user when providing an AR service and include an infrared (IR) lighting to acquire an image using the camera even when a surrounding environment is dark.

Although the electronic device identifies the ambient brightness using an image acquired by the camera, it may not readily identify the ambient brightness only using the camera because an amount of ambient light of the camera increases when the IR lighting is turned on in a dark environment. Thus, although the electronic device requires an illuminance sensor to accurately identify the ambient brightness, the inclusion of the illuminance sensor may increase the volume of the electronic device and the cost used for the electronic device.

SUMMARY

According to an example embodiment, a method of controlling an electronic device including an electrochromic device is provided, the method including: acquiring a first image frame using a camera of the electronic device; based on an infrared (IR) lighting of the electronic device being on, turning off the IR lighting; acquiring a second image frame using the camera while the IR lighting is off; and based on the first image frame being acquired with the IR lighting on, controlling a transmittance of the electrochromic device based on a brightness of the second image frame.

According to an example embodiment, an electronic device including a camera, an infrared (IR) lighting, an electrochromic device, at least one processor, and at least one memory configured to store therein processor-implemented instructions is provided. The instructions, when executed, may cause the processor to control the electronic device to: acquire a first image frame using the camera; turn off the IR lighting based on the IR lighting being on; acquire a second image frame using the camera while the IR lighting is off; and based on the first image frame being acquired with the IR lighting on, control a transmittance of the electrochromic device based on a brightness of the second image frame.

According to an example embodiment, a method of controlling an electronic device including an electrochromic device is provided, the method including: acquiring an image using a camera of the electronic device; and based on the image being acquired while an infrared (IR) lighting of the electronic device being on, controlling a transmittance of the electrochromic device based on a brightness of a first area in the image not affected by the IR lighting.

According to an example embodiment, an electronic device including an electrochromic device may acquire an image while an IR lighting is off for an image frame that is not to be used for hand and head tracking among multiple frames and use the acquired image to identify an ambient brightness, thereby detecting the ambient brightness without being affected by the IR lighting even without an illuminance sensor and controlling the electrochromic device based on the detected ambient brightness.

According to an example embodiment, an electronic device including an electrochromic device may use an area in an image frame that is not affected by an IR lighting to verify an ambient brightness, thereby detecting the ambient brightness without an illuminance sensor and controlling the electrochromic device based on the detected ambient brightness.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
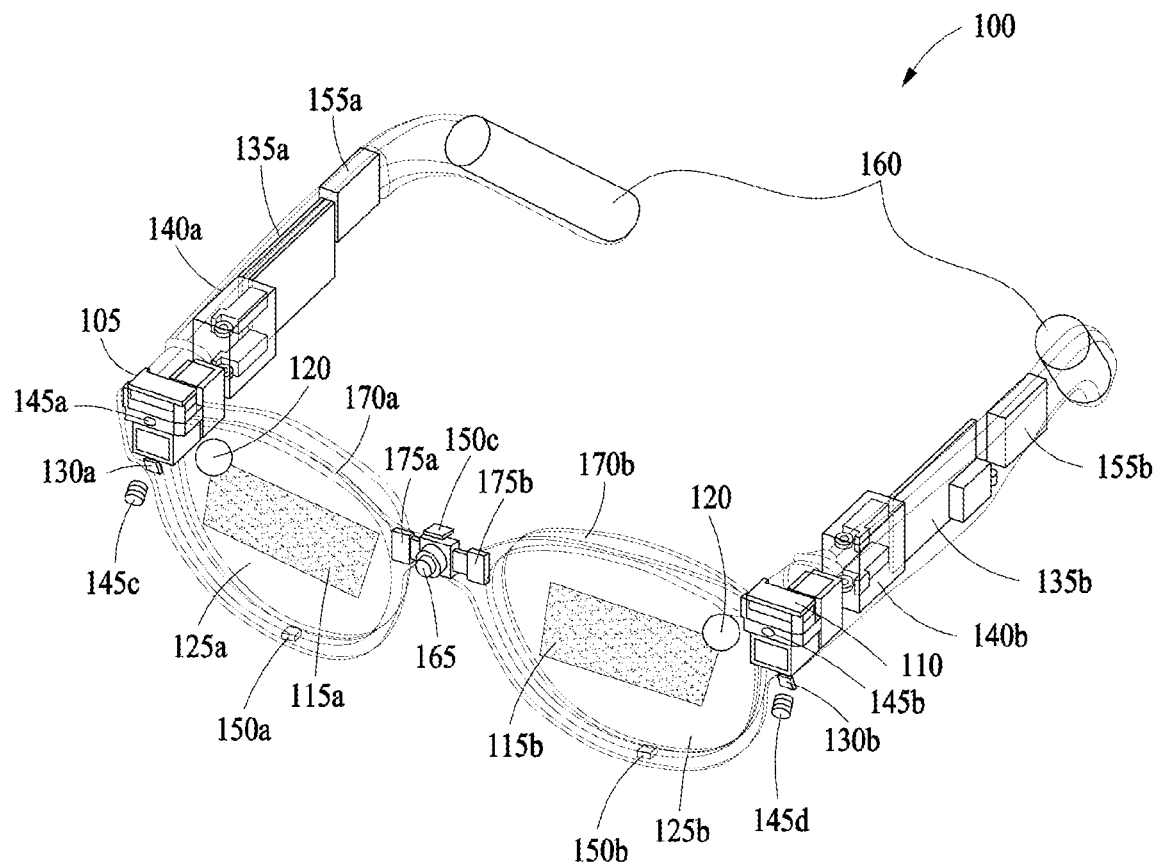
FIG. 1 a perspective view illustrating an example structure of an electronic device according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a perspective view illustrating an example structure of an electronic device according to various embodiments.

Referring to FIG. 1, an electronic device 100 may be worn on a face of a user to provide the user with an image associated with an augmented reality (AR) service and/or a virtual reality (VR) service.

In an example embodiment, the electronic device 100 may include a first display 105, a second display 110, screen display portions 115a and 115b, an optical input member 120, a first transparent member 125a, a second transparent member 125b, lighting units 130a and 130b, a first printed circuit board (PCB) 135a, a second PCB 135b, a first hinge 140a, a second hinge 140b, first cameras camera 145a, 145b, 145c, and 145d, a plurality of microphones (e.g., a first microphone 150a, a second microphone 150b, and a third microphone 150c), a plurality of speakers (e.g., a first speaker 155a and a second speaker 155b), a battery 160, second cameras 175a and 175b, a third camera 165, and visors 170a and 170b.

In an example embodiment, a display (e.g., the first display 105 and the second display 110) may include, for example, a liquid crystal display (LCD), a digital mirror device (DMD), or a liquid crystal on silicon (LCoS), an organic light-emitting diode (OLED), a micro light-emitting diode (micro-LED), or the like. Although not illustrated in the drawings, when the display is one of an LCD, a DMD, and an LCoS, the electronic device 100 may include a light source configured to emit light to a screen output area of the display. In an example embodiment, when the display is capable of generating light by itself, for example, when the display is either an OLED or a micro-LED, the electronic device 100 may provide a virtual image of a relatively high quality to the user even though a light source is not included. For example, when the display is implemented as an OLED or a micro-LED, such a light source may be unnecessary, and accordingly the electronic device 100 may be lightened. The display capable of generating light by itself may be referred to herein as a "self-luminous display," and the following description will be made on the assumption of the self-luminous display.

In an example embodiment, the display (e.g., the first display 205 and the second display 210) may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display may provide a high resolution without a backlight unit (BLU), when it is implemented by the micro-LED as described above.

However, examples are not limited thereto, and a single pixel may include R, G, and B, and a single chip may be implemented by a plurality of pixels including R, G, and B pixels.

In an example embodiment, the display (e.g., the first display 205 and the second display 210) may include a display area including pixels for displaying a virtual image and light-receiving pixels (e.g., photosensor pixels) that are disposed between pixels and configured to receive light reflected from eyes of a user, convert the received light into electrical energy, and output the electrical energy.

In an example embodiment, the electronic device 100 may detect a gaze direction (e.g., a movement of a pupil) of the user using the light-receiving pixels. For example, the electronic device 100 may detect and track a gaze direction of a right eye of the user and a gaze direction of a left eye of the user through one or more light-receiving pixels of the first display 105 and one or more light-receiving pixels of the second display 110. The electronic device 100 may determine a central position of a virtual image based on the gaze directions (e.g., directions in which the pupils of the right eye and the left eye of the user gaze) that are detected through the light-receiving pixels.

In an example embodiment, light emitted from the display (e.g., the first display 105 and the second display 110) may reach the screen display portion 115a formed on the first transparent member 125a that faces the right eye of the user and the screen display portion 115b formed on the second transparent member 125b that faces the left eye of the user, by passing through a lens (not shown) and a waveguide. For example, the light emitted from the display (e.g., the first display 105 and the second display 110) may be reflected from a grating area formed in the optical input member 120 and the screen display portions 115a and 115b by passing through the waveguide, and may then be transmitted to the eyes of the user. The first transparent member 125a and/or the second transparent member 125b may be formed of, for example, a glass plate, a plastic plate, or a polymer, and may be transparently or translucently formed.

In an example embodiment, the lens (not shown) may be disposed in front of the display (e.g., the first display 105 and the second display 110). The lens (not shown) may include a concave and/or convex lens. For example, the lens (not shown) may include a projection lens or a collimation lens.

In an example embodiment, the screen display portions 115a and 115b or a transparent member (e.g., the first transparent member 125a and the second transparent member 125b) may include a reflective lens, a lens including the waveguide.

The waveguide may be formed of glass, plastic, or a polymer, and may have a nanopattern formed on one surface of the inside or outside thereof, for example, a grating structure of a polygonal or curved shape. In an example embodiment, light incident on one end of the waveguide may be propagated inside a display waveguide by the nanopattern to be provided to the user. For example, the waveguide formed as a freeform prism may provide the incident light to the user through a reflection mirror.

The waveguide may include at least one of a reflective element (e.g., a reflection mirror) and at least one diffractive element (e.g., a diffractive optical element (DOE) or a holographic optical element (HOE)). The waveguide may guide light emitted from the display (e.g., the first display 105 and the second display 110) to the eyes of the user, using the at least one diffractive element or the reflective element included in the waveguide.

In an example embodiment, the diffractive element may include the optical input member 120 and/or an optical output member (not shown). For example, the optical input member 120 may refer to an input grating area, and the optical output member may refer to an output grating area. The input grating area may function as an input end to diffract (or reflect) light output from the display (e.g., the first display 105 and the second display 110) (e.g., a micro-LED) to transmit the light to the transparent member (e.g., the first transparent member 150a and the second transparent member 150b) of the screen display portions 115a and 215b. The output grating area may function as an outlet to diffract (or reflect), to the eyes of the user, light transmitted to the transparent member (e.g., the first transparent member 150a and the second transparent member 150b) of the waveguide.

In an example embodiment, the reflective element may include an optical total reflection element or a total reflection waveguide for total internal reflection (TIR). For example, total reflection or TIR, which is one of schemes for inducing light, may form an angle of incidence such that light (e.g., a virtual image) input through the input grating area is completely or almost completely reflected from a portion (e.g., a specific surface) of the waveguide, to completely or almost completely transmit the light to the output grating area.

In an example embodiment, light emitted from the display (e.g., the first display 105 and the second display 110) may be guided by the waveguide through the optical input member 120. The light traveling in the waveguide may be guided toward the eyes of the user through the optical output member. The screen display portions 115a and 115b may be determined based on the light emitted toward the eyes of the user.

In an example embodiment, the first cameras 145a, 145b, 145c, and 145d may include cameras used for three degrees of freedom (3DoF) and six degrees of freedom (6DoF) head tracking, hand detection and tracking, and gesture and/or spatial recognition. For example, the first cameras 145a, 145b, 145c, and 145d may each include a global shutter (GS) camera to detect and track movements of a head or hand.

For example, the first cameras 145a, 145b, 145c, and 145d may use a stereo camera for head tracking and spatial recognition, and may use cameras of the same specification and performance. For example, for detection and tracking of a quick hand movement and a fine finger movement, a GS camera exhibiting a favorable performance (e.g., image drag) may be used.

In an example embodiment, the first cameras 145a, 145b, 145c, and 145d may use a rolling shutter (RS) camera. The first cameras 145a, 145b, 145c, and 145d may perform spatial recognition for 6DoF and a simultaneous localization and mapping (SLAM) function through depth imaging. In addition, the first cameras 145a, 145b, 145c, and 145d may perform a user gesture recognition function.

In an example embodiment, the second cameras 175a and 175b may be used to detect and track the pupils. The second cameras 175a and 175b may also be referred to as an eye tracking (ET) camera. The second cameras 175a and 175b may track a gaze direction of the user. Based on the gaze direction of the user, the electronic device 100 may dispose a center of a virtual image projected onto the screen display portions 115a and 115b at a position depending on a direction in which the pupils of the user gaze.

The second cameras 175a and 175b for tracking the gaze direction may use a GS camera to detect the pupils and track a quick movement of the pupils. The second cameras 175a and 175b may be installed for the left eye and the right eye of the user, respectively, and may use cameras of the same performance and specifications.

In an example embodiment, the third camera 165 may be referred to as a "high resolution (HR) camera" or a "photo video (PV) camera," and may include the HR camera. The third camera 165 may include a color camera having functions for acquiring a high-quality image, such as, for example, an automatic focus (AF) function and an optical image stabilizer (OIS). However, examples of the third camera 165 are not limited thereto, and may include a GS camera or an RS camera.

In an example embodiment, at least one sensor (not shown)(e.g., a gyro sensor, an acceleration sensor, a geomagnetic sensor, and/or a gesture sensor), the first cameras 145a, 145b, 145c, and 145d may perform at least one of head tracking for 6DoF, pose estimation and prediction, gesture and/or spatial recognition, and a SLAM function through depth imaging.

In an example embodiment, the first cameras 145a, 145b, 145c, and 145d may be classified and used as a camera for head tracking and a camera for hand tracking.

The lighting units 130a and 130b may be used differently according to positions to which the light units 130a and 130b are attached. For example, the lighting units 130a and 130b may be attached around a hinge (e.g., the first hinge 140a and the second hinge 140b) connecting a frame (e.g., a rim) and a temple, or be attached around a first camera (e.g., 145a, 145b, 145c, and 145d) mounted adjacent to a bridge connecting the frame. For example, when a GS camera is used to capture an image, the lighting units 130a and 130b may be used to supplement a surrounding brightness. For example, the lighting units 130a and 130b may be used in a dark environment or when it is not easy to detect an object to be captured due to a mixture or a reflection of various light sources.

The lighting units 130a and 130b attached around the frame of the electronic device 100 may be used as an auxiliary means for facilitating eye-gaze detection when the pupils are captured using the second cameras 175a and 175b. When the lighting units 130a and 130b are used as the auxiliary means for detecting the gaze direction, they may include an IR LED with an IR light wavelength.

In an example embodiment, a PCB (e.g., the first PCB 135a and the second PCB 135b) may include a processor including various processing circuitry (not shown) configured to control components of the electronic device 100, a memory (not shown), and a communication module (not shown). The communication module may establish a direct (or wired) communication channel or wireless communication channel between the electronic device 100 and an external electronic device, and support communication through the established communication channel. The PCB may transmit an electrical signal to the components included in the electronic device 100.

The communication module (not shown) may include various communication circuitry including one or more communication processors that are operable independently of the processor and that support direct (e.g., wired) communication or wireless communication. According to an example embodiment, the communication module may include a wireless communication module (e.g., a cellular communication module, a short-range wireless communication module, or a global navigation satellite system (GNSS)

communication module) or a wired communication module (e.g., a local area network (LAN) communication module or a power line communication (PLC) module). A corresponding one of these communication modules may communicate with an external electronic device via a short-range communication network, such as Bluetooth™, wireless-fidelity (Wi-Fi) direct, or infrared data association (IrDA)) or a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other.

The wireless communication module may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna.

The electronic device 100 may further include an antenna module including at least one antenna (not shown). The antenna module may transmit or receive a signal or power to or from the outside (e.g., an external electronic device) of the electronic device 100. According to an example embodiment, the antenna module may include an antenna including a radiating element including a conductive material or a conductive pattern formed in or on a substrate (e.g., the first PCB 135a and the second PCB 135b). According to an example embodiment, the antenna module may include a plurality of antennas (e.g., array antennas).

In an example embodiment, a plurality of microphones (e.g., the first microphone 150a, the second microphone 150b, and the third microphone 150c) may process an external sound signal into electrical audio data. The audio data may be used in various ways according to a function (or application) being performed (or executed) in the electronic device 100.

In an example embodiment, a plurality of speakers (e.g., the first speaker 155a and the second speaker 155b) may output audio data received from the communication module or stored in the memory.

In an example embodiment, the battery 160 may be provided as one or more batteries, and may supply power to the components included in the electronic device 100.

In an example embodiment, the visors 170a and 170b may adjust a transmitted amount of external light incident on the eyes of the user based on a transmittance. The visors 170a and 170b may be disposed on a front or rear side of the screen display portions 115a and 115b. The front side of the screen display portions 115a and 115b may indicate a direction opposite to a user's side of the user wearing the electronic device 100, and the rear side of the screen display portions 115a and 115b may indicate a direction of the user's side of the user wearing the electronic device 100. The visors 170a and 170b may protect the screen display portions 115a and 115b and adjust the transmitted amount of the external light.

For example, the visors 170a and 170b may each include an electrochromic device that changes in color according to applied power and adjusts the transmittance. Electrochromism refers to a phenomenon in which color changes in response to an occurrence of an oxidation-reduction reaction by applied power. The visors 170a and 170b may adjust the transmittance of the external light using the color change of the electrochromic device.

For example, the visors 170a and 170b may each include a control module and the electrochromic device. The control module may control the electrochromic device to adjust the transmittance of the electrochromic device.

Figure 2A:
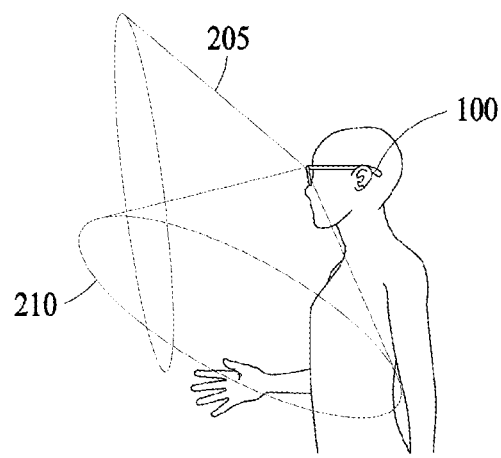
FIGS. 2A, 2B, and 2C are diagrams illustrating an example camera and an example infrared (IR) lighting of an electronic device according to various embodiments.
Figure 2B:
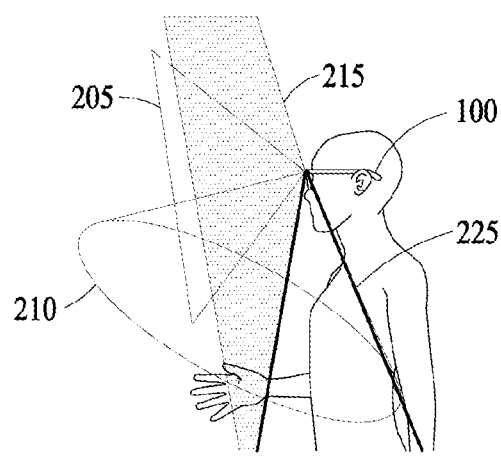
Figure 2C:
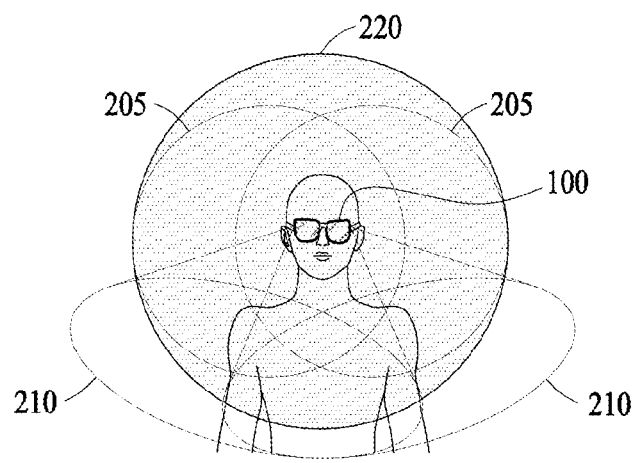

FIGS. 2A, 2B, and 2C are diagrams illustrating an example camera and example IR lighting of an electronic device according to various embodiments.

The electronic device 100 may be worn around a face of a user, providing images associated with AR and/or VR services to the user. In an example embodiment, the electronic device 100 may include a plurality of cameras to provide the AR and/or VR services to the user. The cameras may sense wavelengths of visible and IR areas to acquire image frames, and the electronic device 100 may perform head and hand tracking and recognize a space using the acquired image frames.

For example, FIG. 2A illustrates the user wearing the electronic device and areas 205 and 210 illuminated by the cameras of the electronic device 100. For example, the electronic device 100 may include a front camera configured to acquire an image frame of the front area 205 and a downward-facing camera that faces the area 210 under the front area 205.

In an example embodiment, the electronic device 100 may include an electrochromic device (e.g., the electrochromic device of FIG. 1) and control a transmittance of the electrochromic device based on a brightness of an image frame acquired through a camera of the electronic device 100. For example, the electronic device 100 may control the transmittance of the electrochromic device to be lower as the brightness of the acquired image frame is higher so as to prevent and/or reduce eyes of the user from experiencing glares that may occur by light therearound (or ambient light hereinafter).

The electronic device 100 may acquire an image frame using the camera, and may not readily perform head tracking, hand tracking and spatial recognition (e.g., scene understanding) using an image frame acquired when a brightness around the camera (or ambient brightness hereinafter) is low, or a surrounding environment is dark). In an example embodiment, the electronic device 100 may include an IR lighting (e.g., the lighting units 130a and 130b of FIG. 1) to acquire an image frame with a brightness required for head tracking, hand tracking, and spatial recognition, and may secure a greater amount of light by turning on the IR lighting when the ambient brightness is low or the surrounding environment is dark. For example, FIGS. 2B and 2C are side and front views of the areas 205 and 210 illuminated by the camera of the electronic device 100 and areas 215 and 220 illuminated by the IR lighting.

In an example embodiment, the camera may detect wavelengths of visible and IR areas to acquire an image frame, and a brightness of an image frame acquired while the IR lighting is on may be high (or bright) even though humans actually recognize a surrounding environment as being dark. When controlling the transmittance of the electrochromic device using an image frame acquired with the IR lighting on, the electronic device 100 may lower the transmittance of the electrochromic device because a brightness of the image frame is high even though an actual environment around the user is dark and may thus restrict a view or a field of vision of the user. Thus, the electronic device 100 may require a separate illuminance sensor to identify an ambient brightness that is recognized by the user even when the IR lighting is on.

In an example embodiment, the electronic device 100 may acquire an image frame by turning off the IR lighting for an image frame that is not to be used for head tracking and hand tracking among image frames acquired through the camera and verify (or identify) an ambient brightness using the acquired image frame, thereby detecting the ambient brightness without being affected by the IR lighting even in the absence of an illuminance sensor.

Hereinafter, image frames used in the electronic device 100 and a temporal relationship between the image frames and an IR lighting will be described in greater detail with reference to FIGS. 3A and 3B.

Figure 3A:
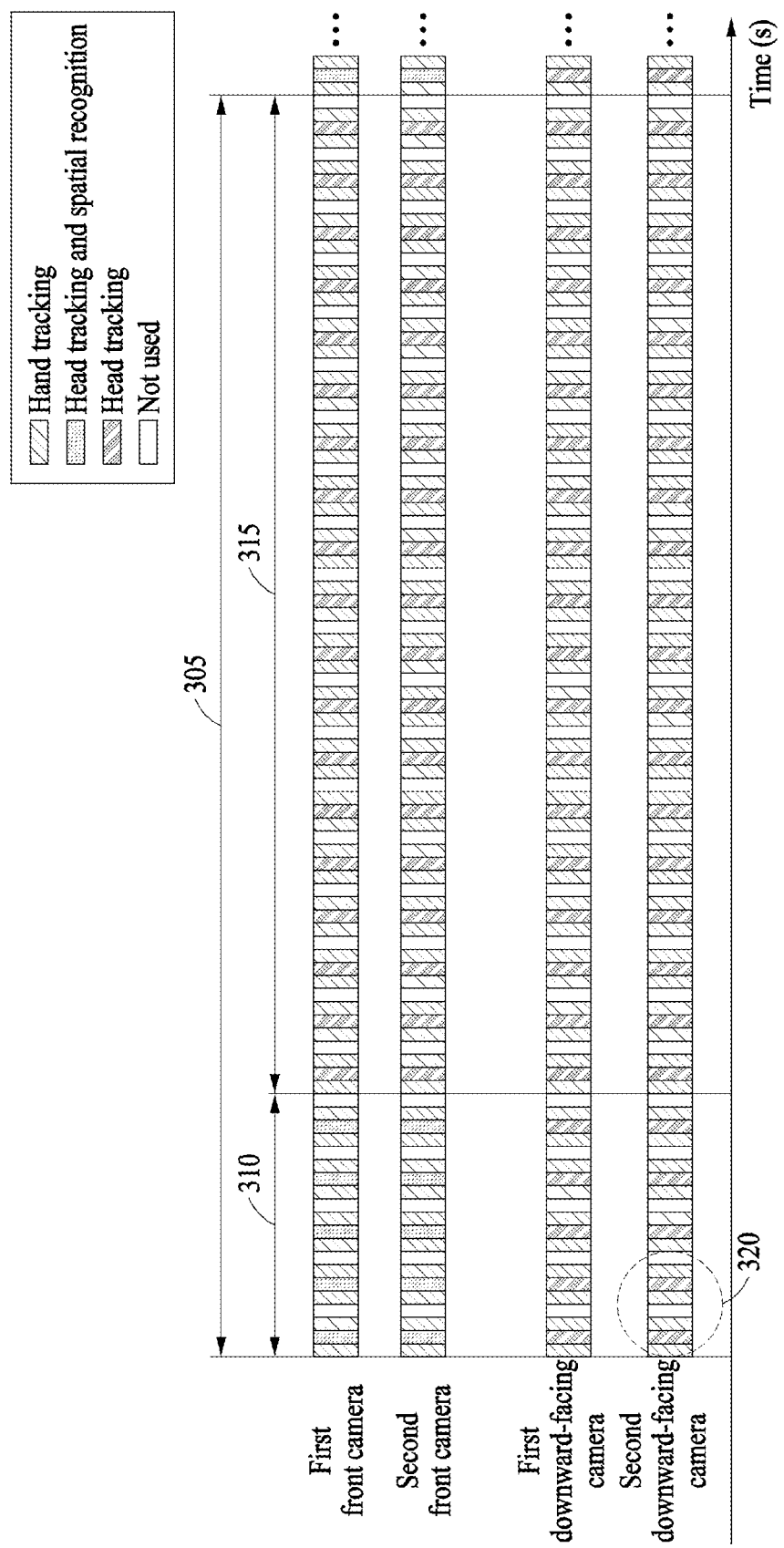
FIG. 3A is a diagram illustrating example image frames used in an electronic device according to various embodiments.
Figure 3B:
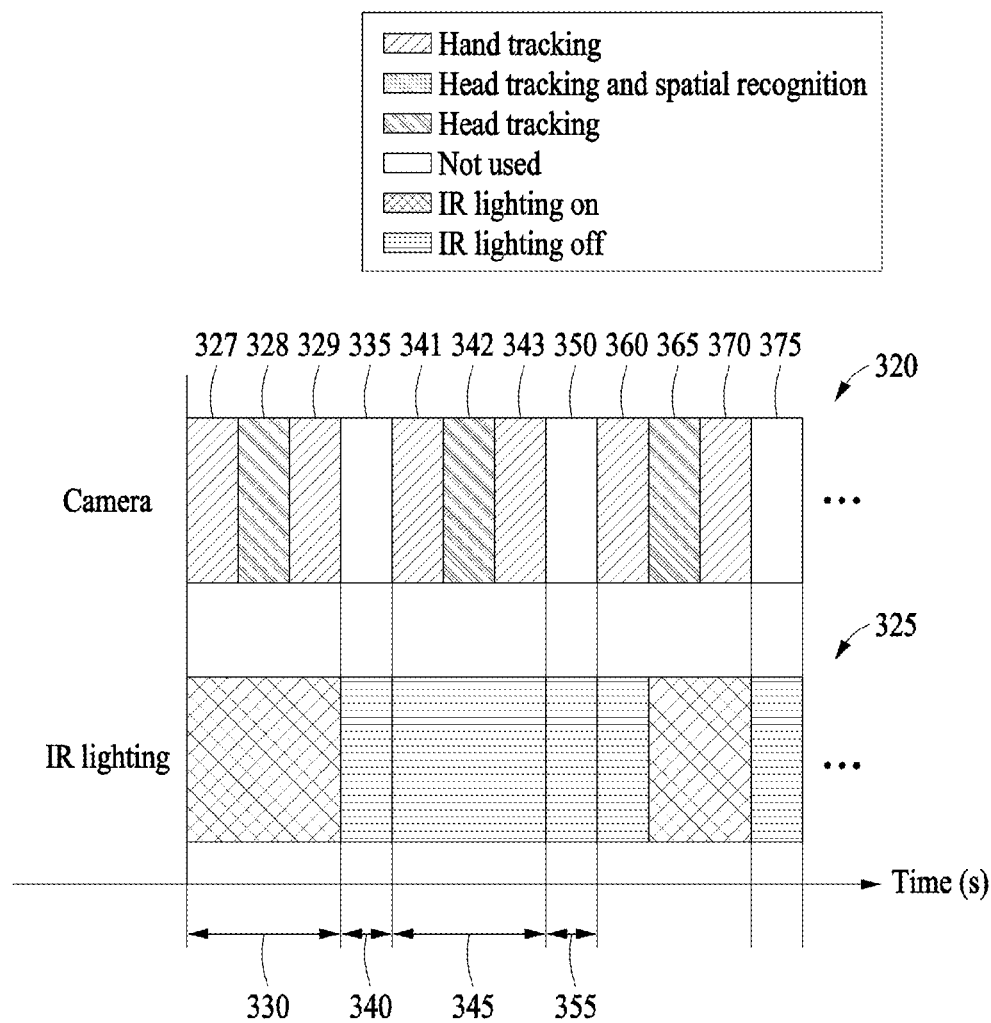
FIG. 3B is a diagram illustrating an example of a temporal relationship between an image frame used in an electronic device and an IR lighting according to various embodiments.

FIG. 3A is a diagram illustrating example image frames used in an electronic device according to various embodiments, and FIG. 3B is a diagram illustrating an example temporal relationship between an image frame used in an electronic device and an IR lighting according to various embodiments.

In an example embodiment, the electronic device 100 may include a plurality of front cameras and a plurality of downward-facing cameras to recognize a wider range. For example, as illustrated, the electronic device 100 may include a first front camera (e.g., the first camera 145a of FIG. 1), a second front camera (e.g., the first camera 145b of FIG. 1), a first downward-facing camera (e.g., the first camera 145c of FIG. 1), and a second downward-facing camera (e.g., the first camera 145d of FIG. 1). The first front camera and the second front camera may be respectively disposed on a left side and a right side of the electronic device 100. The first downward-facing camera and the second downward-facing camera may be respectively disposed on the left side and the right side of the electronic device 100.

The electronic device 100 may perform head tracking, hand tracking, and spatial recognition (e.g., scene understanding) using image frames acquired using the cameras (e.g., the first front camera, the second front camera, the first downward-facing camera, and the second downward-facing camera). The first front camera, the second front camera, the first downward-facing camera, and the second downward-facing camera may sense wavelengths of visible and IR areas and acquire the image frames.

The electronic device 100 may separately include a camera for head tracking, a camera for hand tracking, and a camera for spatial recognition to acquire image frames to be used for head tracking, hand tracking, and spatial recognition, and may be configured to operate these cameras separately. In such a case, however, the volume of the electronic device 100 may increase.

In an example embodiment, to perform head tracking, hand tracking, and spatial recognition, the electronic device 100 may only use the first front camera, the second front camera, the first downward-facing camera, and the second downward-facing camera, without separately including the cameras respectively for head tracking, hand tracking, and spatial recognition, and may operate with a high frame rate to acquire image frames and use the image frames for different purposes.

To perform head tracking, hand tracking, and spatial recognition, respectively, different frame rates may be required. For example, head tracking may require a frame rate of 24 frames per second (fps), hand tracking may require a frame rate of 48 fps, and spatial recognition may require a frame rate of 5 fps. As illustrated in FIG. 3A, the electronic device 100 may operate with 96 fps to perform all head tracking, hand tracking, and spatial recognition, using only the first front camera, the second front camera, the first downward-facing camera, and the second downward-facing camera. However, a frame rate of image frames acquired from the first front camera, the second front camera, the first downward-facing camera, and the second downward-facing camera is not limited to the foregoing example, and the frame rate may be determined in various ways as needed.

The first front camera, the second front camera, the first downward-facing camera, and the second downward-facing camera may be synchronized by the same frame rate as illustrated in FIG. 3A to operate to acquire image frames. FIG. 3A illustrates example image frames acquired when the first front camera, the second front camera, the first downward-facing camera, and the second downward-facing camera operate with 96 fps.

The image frames may be used for different purposes. The image frames illustrated in FIG. 3A may be used for head tracking, hand tracking, and spatial recognition. For example, as illustrated in FIG. 3A, among 96 image frames acquired for a time interval 305 of 1 second, 48 image frames may be used for hand tracking. Five image frames acquired by the front cameras for a time interval 310 of the time interval 305 of 1 second may be used for spatial recognition and head tracking. In addition, five image frames acquired by the downward-facing cameras for the time interval 310 of the time interval 305 of 1 second may be used for head tracking. Further, 19 image frames acquired for a time interval 315 of the time interval 305 of 1 second may be used for head tracking.

When the image frames are acquired by operating the first front camera, the second front camera, the first downward-facing camera, and the second downward-facing camera with a high frame rate as illustrated in FIG. 3A, there may be image frames that are not used for head tracking, hand tracking, and spatial recognition.

FIG. 3B illustrates some image frames 320 among the image frames of FIG. 3A, and a state 325 of an IR lighting when each image frame is acquired.

Referring to FIG. 3B, the electronic device 100 may acquire first image frames 327, 328, and 329 for a time interval 330. A first image frame may be an image frame that is to be used for at least one of hand tracking, head tracking, or spatial recognition. An ambient brightness before the time interval 330 may be determined to be low, or a surrounding environment therebefore may be determined to be dark, and thus the IR lighting may be turned on when the first image frames 327, 328, and 329 are acquired for the time interval 330.

The electronic device 100 may acquire a second image frame 335 for a time interval 340. The second image frame 335 may be an image frame that is not to be used for hand tracking, head tracking, and spatial recognition.

When acquiring a second image frame (e.g., second image frames 335 and 350) that is not to be used for hand tracking, head tracking, and spatial recognition, the electronic device 100 may acquire the second image frame (e.g., the second image frames 335 and 350) by turning off the IR lighting regardless of whether the IR lighting is on before. For the time interval 340, the electronic device 100 may acquire the second image frame 335 by turning off the IR lighting that is on for a previous time interval which is the time interval 330. The electronic device 100 may control a transmittance of an electrochromic device of the electronic device 100 based on a brightness of the second image frame 335 acquired for the time interval 340. For example, as the brightness of the second image frame 335 is higher, the electronic device 100 may control the transmittance of the electrochromic device to be lower.

When at least one of the first image frames 327, 328, and 329 is acquired while the IR lighting is on, the electronic device 100 may determine a brightness difference between the at least one of the first image frames 327, 328, and 329 acquired while the IR lighting is on and the second image frame 335 by comparing a brightness of the at least one of the first image frames 327, 328, and 329 and a brightness of the second image frame 335.

The electronic device 100 may turn on or off the IR lighting based on the brightness difference. For example, the electronic device 100 may turn on the IR lighting when the brightness difference is greater than or equal to a first threshold value, and turn off the IR lighting when the brightness difference is less than the first threshold value. A small brightness difference may indicate that a surrounding environment is sufficiently bright, and thus the IR lighting may not be required to acquire an image to be used for hand tracking, head tracking, and spatial recognition.

In the example of FIG. 3B, the electronic device 100 may not turn on the IR lighting because the brightness difference between the at least one of the first image frames 327, 328, and 329 and the second image frame 335 is less than the first threshold value. When the electronic device 100 does not turn on the IR lighting in the time interval 340, the electronic device 100 may acquire first image frames 341, 342, and 343 while the IR lighting is off in a time interval 345.

In a case where the IR lighting is off when acquiring a first image frame (e.g., at least one of the first image frames 327, 328, 329, 341, 342, and 343), the electronic device 100 may control the transmittance of the electrochromic device based on a brightness of the acquired first image frame. For example, as the brightness of the first image frame is higher, the electronic device 100 may control the transmittance of the electrochromic device to be lower.

In a case where the IR lighting is off when acquiring a first image frame (e.g., at least one of the first image frames 327, 328, 329, 341, 342, and 343), the electronic device 100 may not turn on or off the IR lighting based on a brightness of the first image frame. For example, when the brightness of the first image frame is less than or equal to a second threshold value, the brightness of the first image frame may not be high enough to perform hand tracking, head tracking, and spatial recognition, and thus the electronic device 100 may turn on the IR lighting to secure a greater amount of light.

The electronic device 100 may acquire a second image frame 350 for a time interval 355. In a case where the IR lighting is on when acquiring the second image frame 350, the electronic device 100 may turn off the IR lighting and acquire the second image frame 350. When the first image frames 341, 342, and 343 are acquired while the IR lighting is off, the electronic device 100 may not use the second image frame 350 to control the electrochromic device and the IR lighting.

In an example embodiment, the electronic device 100 may control the transmittance of the electrochromic device and control the IR lighting based on a brightness of the second image frame 350 in the same way as performed with the first images 327, 328, 329, 341, 342, and 343. For example, when the first image frames 341, 342, and 343 are acquired while the IR lighting is off, the electronic device 100 may control the transmittance of the electrochromic device to be lower as the brightness of the second image frame 350 is higher. For another example, when the first image frames 341, 342, and 343 are acquired while the IR lighting is off, the electronic device 100 may turn on the IR lighting in response to the brightness of the second image frame 350 being less than or equal to the second threshold value, so as to secure a greater amount of light.

In the example of FIG. 3B, the IR lighting may be off when a first image frame 360 is acquired. A brightness of the first image frame 360 may be less than the second threshold value, and the electronic device 100 may turn on the IR lighting based on the brightness of the first image frame 360. The electronic device 100 may acquire a first image frame 365 while the IR lighting is on. Since the first image frame 365 is acquired while the IR lighting is on, the electronic device 100 may turn off the IR lighting and acquire a second image frame 375, and control the electrochromic device based on a brightness of the second image frame 375. The electronic device 100 may compare a brightness of at least one of the first image frames 365 and 370 and a brightness of the second image frame 375 and determine a brightness difference therebetween. The electronic device 100 may control the IR lighting based on the brightness difference.

In an example embodiment, the electronic device 100 may acquire a second image frame that is not to be used for hand tracking, head tracking, and spatial recognition while the IR lighting is off, and control the transmittance of the electrochromic device and the IR lighting using the acquired second image frame, thereby reducing the volume of the electronic device 100, without a separate illuminance sensor or a separate camera for hand tracking, head tracking, and spatial recognition.

Hereinafter, a method of controlling the electronic device 100 will be described in greater detail with reference to FIG. 4.

Figure 4:
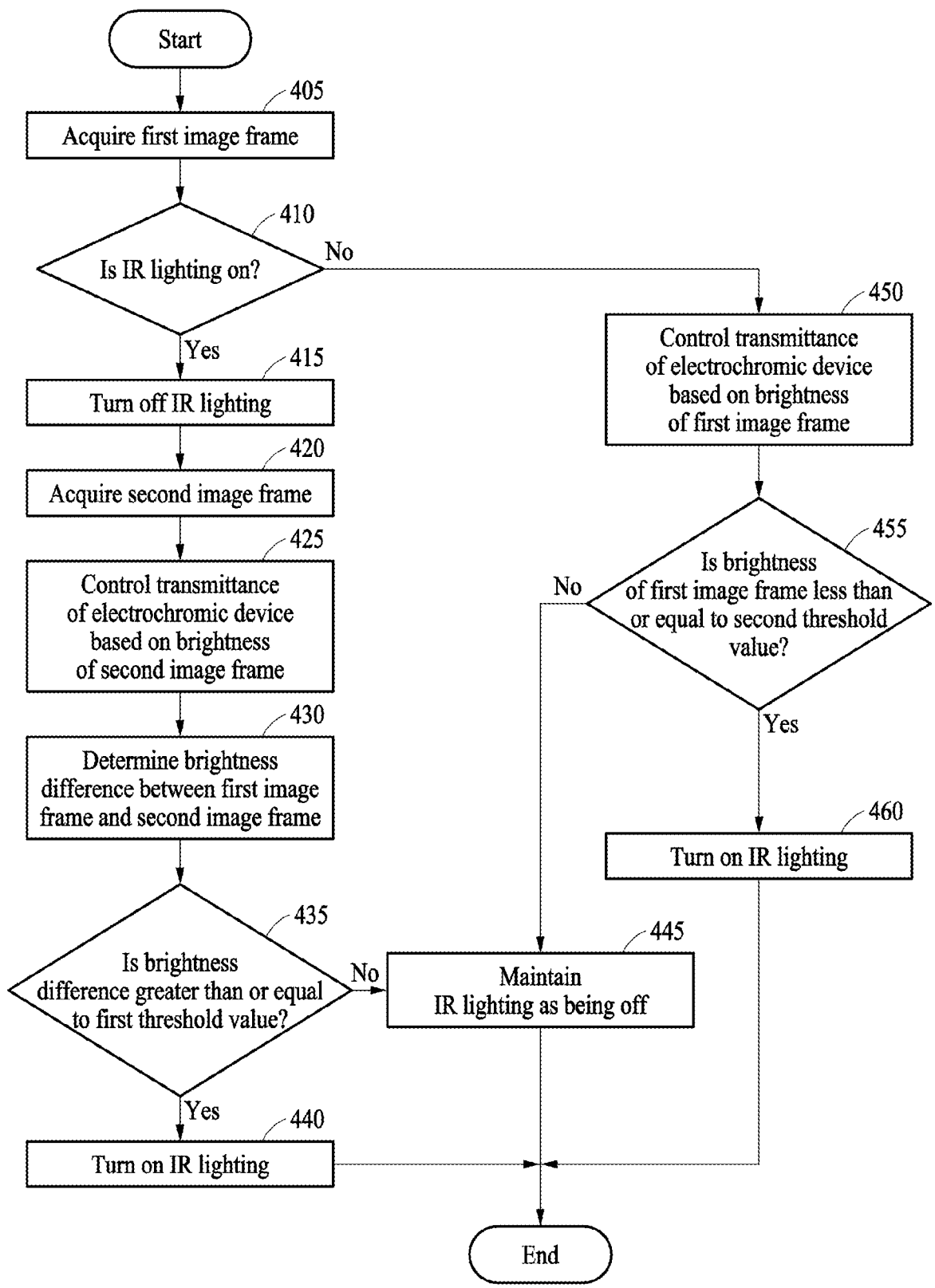
FIG. 4 is a flowchart illustrating an example method of controlling an electronic device according to various embodiments.

FIG. 4 is a flowchart illustrating an example method of controlling an electronic device according to various embodiments.

Referring to FIG. 4, in operation 405, the electronic device 100 may acquire a first image frame using a camera (e.g., at least one of the first front camera, the second front camera, the first downward-facing camera, or the second downward-facing camera of FIG. 2) In operation 410, the electronic device 100 may verify whether an IR lighting is on.

In an example embodiment, when the first image frame (e.g., the first image frames 327, 328, and 329 of FIG. 3A) is acquired with the IR lighting on, the electronic device 100 may control an electrochromic device based on a brightness of a second image frame (e.g., the second image frame 340 of FIG. 3A). When a first image frame (e.g., the first image frames 341, 342, and 343 of FIG. 3A) is acquired with the IR lighting off, the electronic device 100 may control the electrochromic device based on a brightness of the first image frame (e.g., the first image frames 341, 342, and 343 of FIG. 3A).

In operation 415, when the first image frame is acquired with the IR lighting on, the electronic device 100 may turn off the IR lighting to acquire the second image frame. In operation 420, the electronic device 100 may acquire the second image frame. The second image frame may be an image frame that is acquired with the IR lighting off and is not affected by the IR lighting.

In operation 425, the electronic device 100 may control a transmittance of the electrochromic device based on the brightness of the second image frame. For example, as the brightness of the second image frame is higher, the electronic device 100 may control the transmittance of the electrochromic device to be lower.

In operation 430, the electronic device 100 may determine a brightness difference between the first image frame and the second image frame by comparing the brightness of the first image frame and the brightness of the second image frame. In operation 435, the electronic device 100 may determine whether the brightness difference is greater than or equal to a first threshold value.

That the brightness difference is greater than or equal to the first threshold value may indicate that an amount of light increases by turning on the IR lighting when a surrounding environment is dark. Thus, in operation 440, the electronic device 100 may turn on the IR lighting to secure a greater amount of light for a subsequent image frame.

In an example embodiment, the electronic device 100 may turn on the IR lighting based on the brightness of the second image frame, without comparing the brightness of the first image frame and the brightness of the second image frame. For example, when the brightness of the second image frame is less than or equal to a second threshold value, the electronic device 100 may turn on the IR lighting.

In operation 445, when the brightness difference is less than the first threshold value, it may indicate that there is no significant difference in brightness of the images when the IR lighting is on because the surrounding environment is sufficiently bright, and thus the electronic device 100 may maintain the IR lighting to be off.

In an example embodiment, the electronic device 100 may control the transmittance of the electrochromic device based on the brightness difference determined in operation 430 without performing operation 425. For example, as the brightness difference determined in operation 430 is smaller, the electronic device 100 may control the transmittance of the electrochromic device to be lower.

In operation 450, when the IR lighting is verified to be off in operation 410, the electronic device 100 may control the transmittance of the electrochromic device based on the brightness of the first image frame. For example, as the brightness of the first image frame is higher, the electronic device 100 may control the transmittance of the electrochromic device to be lower.

In operation 455, the electronic device 100 may determine whether the brightness of the first image frame is less than or equal to the second threshold value. In operation 460, when the brightness of the first image frame is less than or equal to the second threshold value, the electronic device 100 may turn on the IR lighting to secure a greater amount of light.

When the brightness of the first image frame exceeds the second threshold value, there may be no need to secure a greater amount of light, and thus the electronic device 100 may maintain the IR lighting to be off in operation 445.

In an example embodiment, when the first image frame is acquired with the IR lighting off in operation 405, the electronic device 100 may acquire the second image frame with the IR lighting off in the same way as the foregoing case where the electronic device 100 acquires the first image frame with the IR lighting on, and then control the transmittance of the electrochromic device based on a brightness of the second image frame.

In an example embodiment, the electronic device 100 may iteratively perform operations 405, 410, 415, 420, 425, 430, 435, 440, 445, 450, 455, and 460 described above with reference to FIG. 4. By performing operations 405, 410, 415, 420, 425, 430, 435, 440, 445, 450, 455, and 460 described above with reference to FIG. 4, the electronic device 100 may control the electrochromic device and the IR lighting based on an ambient brightness without an illuminance sensor, and perform hand tracking, head tracking, and spatial recognition.

Hereinafter, a method of controlling a transmittance of an electrochromic device based on an area in an image frame will be described in greater detail with reference to FIGS. 5A and 5B, and 6.

Figure 5A:
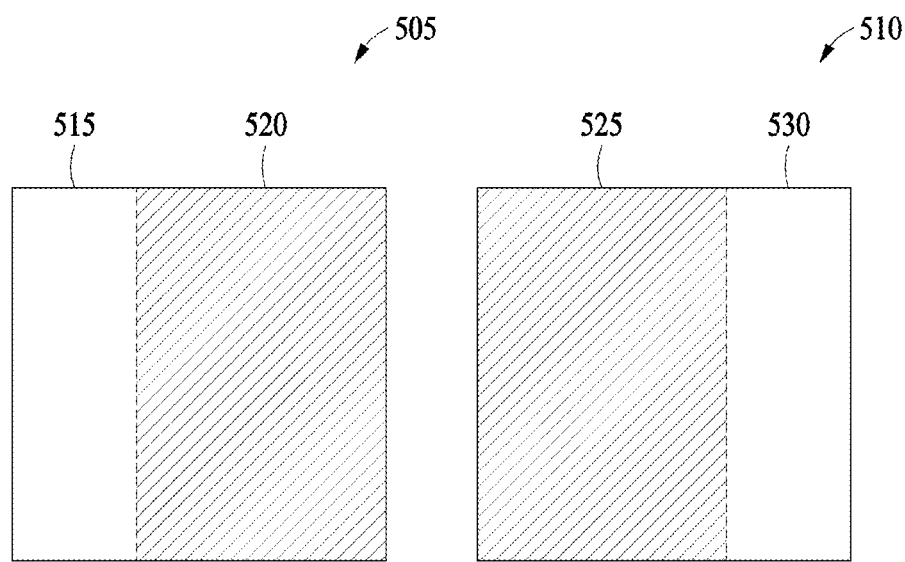
FIGS. 5A and 5B are diagrams illustrating an example area affected by an IR lighting in an image acquired using a camera of an electronic device and an example area not affected by the IR lighting according to various embodiments.
Figure 5B:
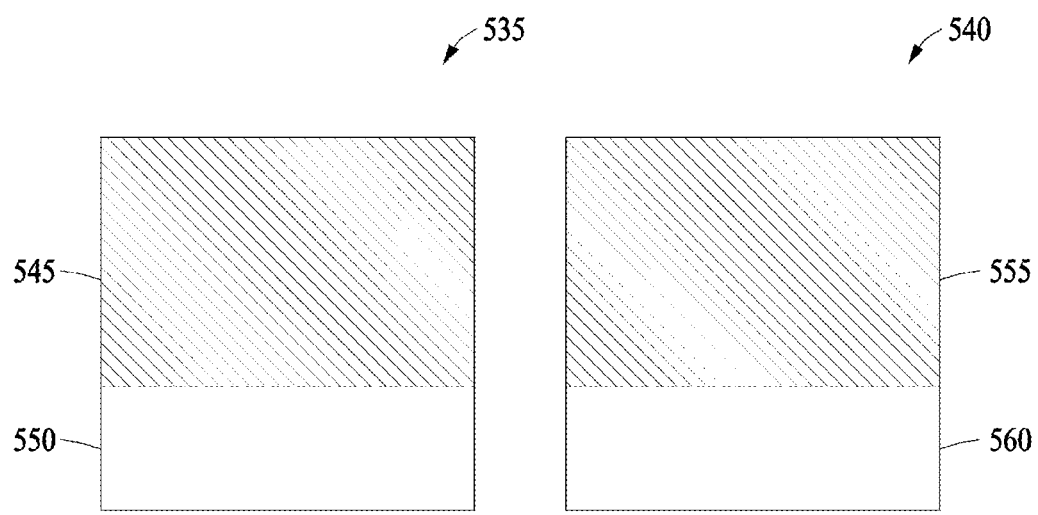

FIGS. 5A and 5B are diagrams illustrating an example area affected by an IR lighting in an image acquired using a camera of an electronic device and an example area not affected by the IR lighting according to various embodiments.

Referring to FIG. 5A, an image frame 505 may be acquired by a first front camera (e.g., the first camera 145a of FIG. 1) and an image frame 510 may be acquired by a second front camera (e.g., the first camera 145b of FIG. 1). In an example embodiment, the first front camera and the second front camera may be respectively disposed on left and right sides of the electronic device 100 as illustrated in FIG. 2C.

Referring to FIG. 5B, an image frame 535 may be acquired by a first downward-facing camera (e.g., the first camera 145c of FIG. 1) and an image frame 540 may be acquired by a second downward-facing camera (e.g., the first camera 145d of FIG. 1). The first downward-facing camera and the second downward-facing camera may be respectively disposed on the left and right sides of the electronic device 100 as illustrated in FIG. 2C.

An IR lighting may be disposed in a middle portion of the electronic device 100 as illustrated in FIG. 2C. In an example embodiment, the IR lighting may be disposed on each of the left and right sides of the electronic device 100.

In an example embodiment, an image frame acquired by the first front camera, the second front camera, the first downward-facing camera, and the second downward-facing camera may include first areas 515, 530, 550, and 560 that are not affected by the IR lighting and second areas 520, 525, 545, and 555 that are affected by the IR lighting, according to a disposition of the first front camera, the second front camera, the first downward-facing camera, and the second downward-facing camera. For example, referring to FIG. 2B, an area 225 may be included in an image frame acquired by the first downward-facing camera and the second downward-facing camera, and may be out of a direction in which the IR lighting is illuminated and may thus not be affected by the IR lighting, and an area corresponding to the area 225 in the image frame may be relatively dark even when the IR lighting is on.

A first area (e.g., 515, 530, 550, and 560) and a second area (e.g., 520, 525, 545, and 555) may be adjacent to each other as illustrated in FIGS. 5A and 5B, but examples of which are not limited thereto, and the first area and the second area may be determined to have various forms in an image frame. For example, the first area may be a portion of the first areas 515, 530, 550, and 560 illustrated in FIGS. 5A and 5B, and the second area may be a portion of the second areas 520, 525, 545, and 555 illustrated in FIGS. 5A and 5B.

In an example embodiment, the electronic device 100 may control a transmittance of an electrochromic device based on a brightness of a first area that is not affected by an IR lighting in an image frame acquired through a camera, and may thus not include a separate illuminance sensor.

Hereinafter, a method of controlling the electronic device 100 according to an example embodiment will be described in greater detail with reference to FIG. 6.

Figure 6:
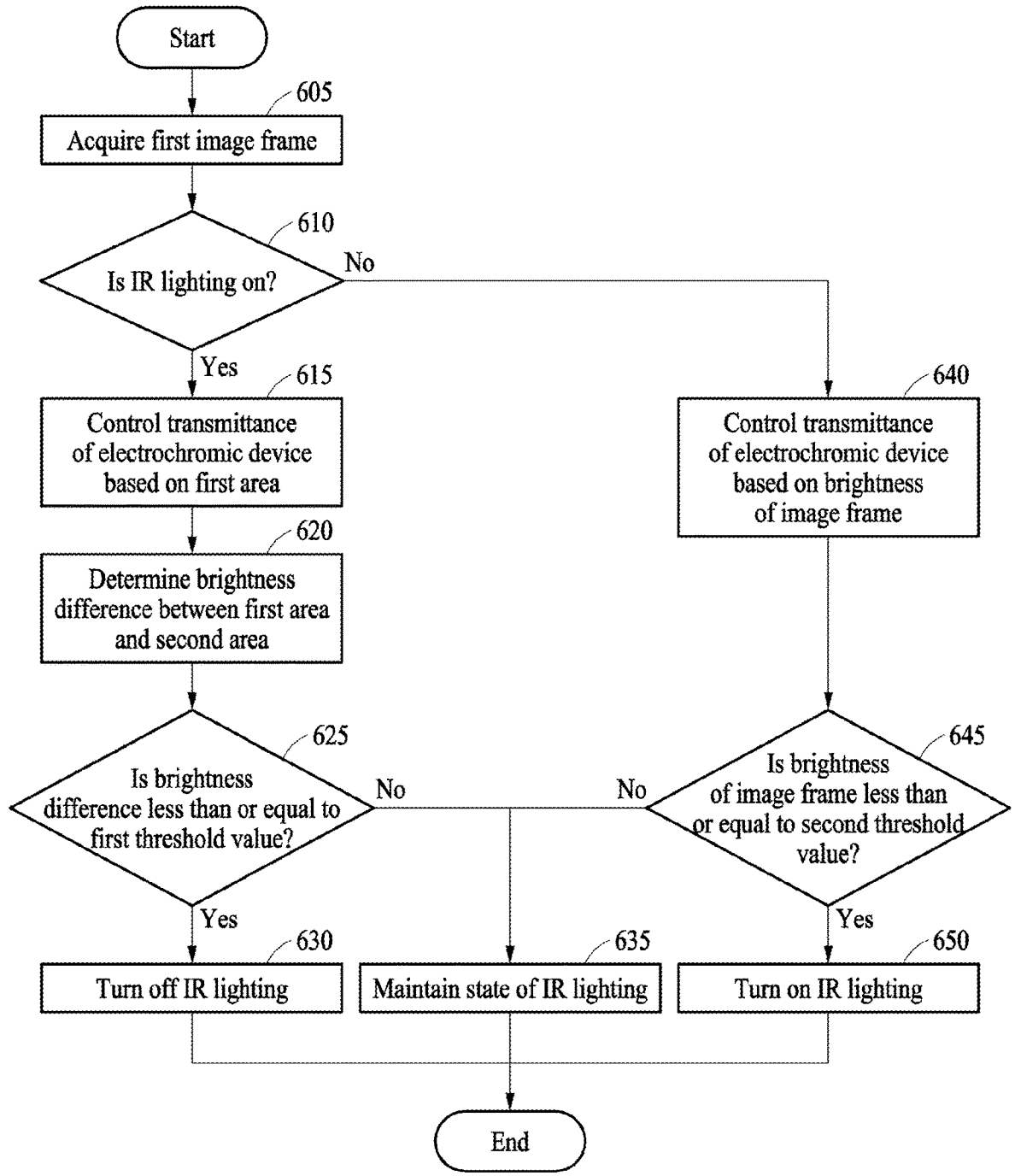
FIG. 6 is a flowchart illustrating an example method of controlling an electronic device according to various embodiments.

FIG. 6 is a flowchart illustrating an example method of controlling an electronic device according to various embodiments.

Referring to FIG. 6, the electronic device 100 may acquire an image frame using a camera (e.g., at least one of the first front camera, the second front camera, the first downward-facing camera, or the second downward-facing camera of FIG. 2) in operation 605.

In operation 610, the electronic device 100 may verify whether an IR lighting is on. In operation 615, when an image frame is acquired with the IR lighting on, the electronic device 100 may control a transmittance of an electrochromic device based on a first area in the image frame. The first area may be an area that is not affected by the IR lighting in the image frame, and the electronic device 100 may control the transmittance of the electrochromic device based on the first area to control the transmittance of the electrochromic device to be suitable for a field of vision of a user even when the IR lighting is on. For example, as a brightness of the first area is higher, the electronic device 100 may control the transmittance of the electrochromic device to be lower.

In operation 620, the electronic device 100 may determine a brightness difference by comparing the brightness of the first area in the image frame and a brightness of a second area in the image frame. The second area may be an area affected by the IR lighting in the image frame. When an ambient brightness is high, the brightness of the image frame may not change significantly even by turning on the IR lighting, and thus a difference between the brightness of the first area and the brightness of the second area may not be great.

In operation 625, the electronic device 100 may determine whether the brightness difference between the first area and the second area is less than or equal to a first threshold value. In operation 630, when the brightness difference is less than or equal to the first threshold value, the electronic device 100 may determine that the ambient brightness is sufficiently high (or a surrounding environment is sufficiently bright), and turn off the IR lighting. By turning off the IR lighting in operation 630, the electronic device 100 may acquire a subsequent image frame while the IR lighting is off.

In operation 635, when the brightness difference exceeds the first threshold value, the electronic device 100 may determine that the ambient brightness is not sufficiently high (or the surrounding environment is not sufficiently bright), and maintain the IR lighting to be on. By maintaining the IR lighting to be on, the electronic device 100 may acquire a subsequent image frame while the IR lighting is on.

In an example embodiment, the electronic device 100 may control the transmittance of the electrochromic device based on the brightness difference determined in operation 620 without performing operation 615. For example, as the brightness difference determined in operation 620 is smaller, the electronic device 100 may control the transmittance of the electrochromic device to be lower.

In operation 640, when the IR lighting is verified to be off in operation 610, the electronic device 100 may control the transmittance of the electrochromic device based on a brightness of an entire area of the image frame. For example, as the brightness of the image frame is higher, the electronic device 100 may control the transmittance of the electrochromic device to be lower.

In operation 645, the electronic device 100 may determine whether the brightness of the image frame is less than or equal to a second threshold value. For example, the electronic device 100 may determine whether the brightness of the entire area of the image frame is less than or equal to the second threshold value.

In operation 650, when the brightness of the image frame is determined to be less than or equal to the second threshold value in operation 645, the electronic device 100 may turn on the IR lighting to secure a greater amount of light. By turning on the IR lighting in operation 650, the electronic device 100 may acquire a subsequent image frame while the IR lighting is on.

In operation 635, when the brightness of the image frame is determined to exceed the second threshold value in operation 645, the electronic device 100 may maintain the IR lighting to be off. By maintaining the IR lighting to be off by the electronic device 100, the electronic device 100 may acquire a subsequent image frame while the IR lighting is off.

In an example embodiment, when the image frame is acquired with the IR lighting off, the electronic device 100 may control the transmittance of the electrochromic device based on the brightness of the first area in the same way as in the foregoing case where the image frame is acquired with the IR lighting on.

In an example embodiment, the electronic device 100 may iteratively perform operations 605, 610, 615, 620, 625, 630, 635, 640, 645, and 650 described above with reference to FIG. 6. The electronic device 100 may perform operations 605, 610, 615, 620, 625, 630, 635, 640, 645, and 650 described above with reference to FIG. 6 to control the electrochromic device and the IR lighting according to an ambient brightness, without an illuminance sensor, and perform hand tracking, head tracking, and spatial recognition.

Hereinafter, a configuration of the electronic device 100 will be described in greater detail with reference to FIG. 7.

Figure 7:
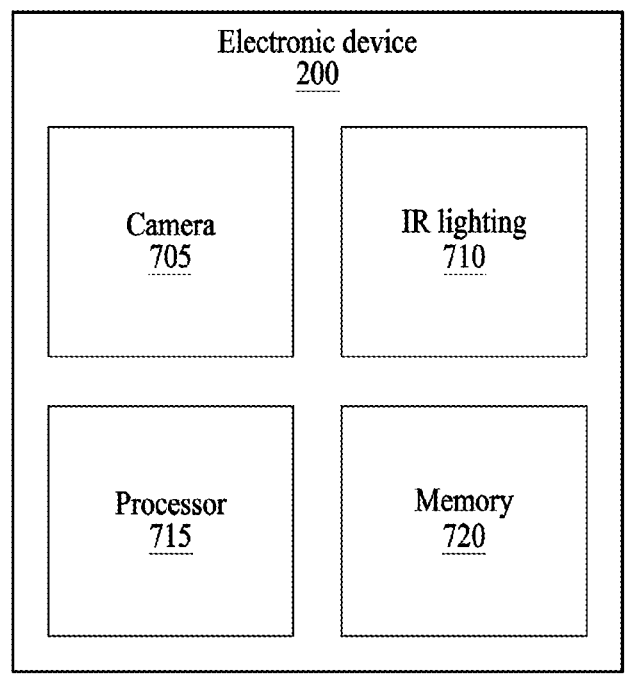
FIG. 7 is a block diagram illustrating an example configuration of an electronic device according to various embodiments.

FIG. 7 is a block diagram illustrating an example configuration of an electronic device according to various embodiments.

Referring to FIG. 7, according to an example embodiment, an electronic device 200 (e.g., the electronic device 100 of FIG. 1) may include a processor (e.g., including processing circuitry) 715 (e.g., the processor (not shown) of FIG. 1), a memory 720 (e.g., the memory (not shown) of FIG. 1), at least one camera 705 (e.g., the first cameras 145*a*, 145*b*, 145*c*, and 145*d*), and at least one IR lighting 710 (e.g., the lighting units 130*a* and 130*b* of FIG. 1).

In an example embodiment, the processor 715 may include various processing circuitry and acquire a first image frame through the camera 705 to perform at least one of hand tracking, head tracking, or spatial recognition.

The processor 715 may verify whether the IR lighting 710 is on. For example, when the first image frame (e.g., the first image frames 327, 328, and 329 of FIG. 3A) is acquired with the IR lighting 710 on, the processor 715 may turn off the IR lighting 710 and acquire a second image frame (e.g., the second image frame 340 of FIG. 3A).

The processor 715 may control a transmittance of an electrochromic device based on a brightness of the second image frame to control a transmittance of the electrochromic device based on an image acquired without an influence of the IR lighting 710. For example, as the brightness of the second image frame is higher, the processor 715 may control the transmittance of the electrochromic device to be lower.

To determine whether to turn on the IR lighting 710, the processor 715 may determine a brightness difference by comparing the brightness of the first image frame and the brightness of the second image frame. The processor 715 may turn on the IR lighting 710 when the brightness difference is greater than or equal to a first threshold value, and maintain the IR lighting 710 to be off when the brightness difference is less than the first threshold value.

In an example embodiment, the processor 715 may control the transmittance of the electrochromic device based on the brightness difference between the first image frame and the second image frame without controlling the transmittance of the electrochromic device based on the brightness of the second image frame. For example, as the brightness difference between the first image frame and the second image frame is smaller, the processor 715 may control the transmittance of the electrochromic device to be lower.

When a first image frame (e.g., the first image frames 341, 342, and 343 of FIG. 3A) is acquired with the IR lighting 710 off, the processor 715 may control the transmittance of the electrochromic device based on the brightness of the first image frame. For example, as the brightness of the first image frame is higher, the processor 715 may control the transmittance of the electrochromic device to be lower.

The processor 715 may determine whether the brightness of the first image frame is less than or equal to a second threshold value. When the brightness of the first image frame is less than or equal to the second threshold value, the processor 715 may turn on the IR lighting 710 to secure a greater amount of light. When the brightness of the first image frame exceeds the second threshold value, the processor 715 may maintain the IR lighting 710 to be off.

When the first image frame is acquired with the IR lighting 710 off, the processor 715 may acquire the second image frame while the IR lighting 710 is off and control the transmittance of the electrochromic device based on the brightness of the second image frame, in the same way as in the case where the first image frame is acquired while the IR lighting 710 is on.

In an example embodiment, the processor 715 may control the electrochromic device and the IR lighting 710 using a first area in the image frame that is not affected by the IR lighting 710 and a second area that is affected by the IR lighting 710.

The processor 715 may acquire an image frame through the camera 705 to perform at least one of hand tracking, head tracking, or spatial recognition.

The processor 715 may determine whether the IR lighting 710 is on. When an image frame is acquired with the IR lighting 710 on, the processor 715 may control the transmittance of the electrochromic device based on a first area in the image frame. For example, as a brightness of the first area is higher, the processor 715 may control the transmittance of the electrochromic device to be lower.

The processor 715 may determine a brightness difference by comparing the brightness of the first area and a brightness of a second area in the image frame to control the IR lighting 710. When the brightness difference is less than or equal to a first threshold value, the processor 715 may determine that an ambient brightness is sufficiently high (or a surrounding environment is sufficiently bright), and turn off the IR lighting 710. When the brightness difference exceeds the first threshold value, the processor 715 may determine that the ambient brightness is still low (or the surrounding environment is still dark), and maintain the IR lighting 710 to be on to secure a greater amount of light.

In an example embodiment, the processor 715 may control the transmittance of the electrochromic device based on the brightness difference between the first area and the second area, not based on the first area. For example, as the brightness difference between the first area and the second area is smaller, the processor 715 may control the transmittance of the electrochromic device to be lower.

In an example embodiment, when the image frame is acquired with the IR lighting 710 off, the processor 715 may control the transmittance of the electrochromic device based on a brightness of the image frame. For example, the processor 715 may control the transmittance of the electrochromic device based on a brightness of an entire area of the image frame. In this example, as the brightness of the entire area of the image frame is higher, the processor 715 may control the transmittance of the electrochromic device to be lower.

The processor 715 may determine whether the brightness of the image frame is less than or equal to a second threshold value to control the IR lighting 710. When the brightness of the image frame is less than or equal to the second threshold value, the processor 715 may turn on the IR lighting 710 to secure a greater amount of light. When the brightness of the image frame exceeds the second threshold value, the processor 715 may maintain the IR lighting 710 to be off.

When the image frame is acquired with the IR lighting 710 off, the processor 715 may control the transmittance of the electrochromic device based on the brightness of the first area, in the same way as in the case where the image frame is acquired with the IR lighting 710 on.

According to an example embodiment, a method of controlling the electronic device including an electrochromic device may include: acquiring a first image frame using the camera of the electronic device, turning off an infrared (IR) lighting based on the IR lighting of the electronic device being on, acquiring a second image frame using the camera while the IR lighting is off, and controlling a transmittance of the electrochromic device based on a brightness of the second image frame based on the first image frame being acquired while the IR lighting is on.

When the first image frame is acquired with the IR lighting on, the method may further include: determining a brightness difference by comparing a brightness of the first image frame and a brightness of the second image frame, and turning on the IR lighting based on the brightness difference being greater than or equal to a first threshold value.

When the brightness of the second image frame is less than or equal to a second threshold value, the method may further include: turning on the IR lighting.

The controlling of the transmittance of the electrochromic device based on the brightness of the second image frame may include: controlling the transmittance of the electrochromic device to be lower as the brightness of the second image frame is higher.

The controlling of the transmittance of the electrochromic device based on the brightness of the second image frame may include controlling the transmittance of the electrochromic device to be lower as the brightness difference is greater.

When the first image frame is acquired with the IR lighting off, the method may further include turning on the IR lighting in response to the brightness of the first image frame being greater than or equal to the second threshold value.

When the first image frame is acquired with the IR lighting off, the method may further include controlling the transmittance of the electrochromic device based on the brightness of the first image frame.

When the first image frame is acquired with the IR lighting off, the method may further include controlling the transmittance of the electrochromic device based on the brightness of the second image frame.

According to an example embodiment, an electronic device (e.g., 200) may include a camera (e.g., 705), an infrared (IR) lighting (e.g., 710), an electrochromic device, and at least one processor (e.g., 715), and at least one memory (e.g., 720) storing therein instructions to be executed by the processor 715. The instructions, when executed may cause the processor to control the electronic device to: acquire a first image frame using the camera; turn off the IR lighting based on the IR lighting being on; acquire a second image frame using the camera while the IR lighting is off; and, based on the first image frame being acquired with the IR lighting on, control a transmittance of the electrochromic device based on a brightness of the second image frame.

The instructions, when executed may further cause the processor to: based on the first image frame being acquired with the IR lighting on, determine a brightness difference by comparing a brightness of the first image frame and the brightness of the second image frame; and, turn on the IR lighting based on the brightness difference being greater than or equal to a first threshold value.

The instructions, when executed, may further cause the processor to control the electronic device to: turn on the IR lighting based on the brightness of the second image frame being less than or equal to a second threshold value.

The controlling of the transmittance of the electrochromic device based on the brightness of the second image frame may include controlling the transmittance of the electrochromic device to be lower as the brightness of the second image frame is higher.

The controlling of the transmittance of the electrochromic device based on the brightness of the second image frame may include controlling the transmittance of the electrochromic device to be lower as the brightness difference is greater.

The instructions, when executed, may further cause the processor to control the electronic device to: turn on the IR lighting in response to the brightness of the first image frame being greater than or equal to the second threshold value, based on the first image frame being acquired with the IR lighting off.

The instructions, when executed, may further cause the processor to control the electronic device to: control the transmittance of the electrochromic device based on the brightness of the first image frame, based on the first image frame being acquired with the IR lighting off.

The instructions, when executed, may further cause the processor to control the electronic device to: control the transmittance of the electrochromic device based on the brightness of the second image frame, based on the first image frame is acquired with the IR lighting off.

According to an example embodiment, a method of controlling an electronic device (e.g., 200) including an electrochromic device may include: acquiring an image using a camera (e.g., 705) of the electronic device; based on the image being acquired while an IR lighting (e.g., 710) of the electronic device is on; controlling a transmittance of the electrochromic device based on a brightness of a first area in the image not affected by the IR lighting.

Based on the image being acquired with the IR lighting on, the method may include: determining a brightness difference by comparing the brightness of the first area and a brightness of a second area affected by the IR lighting; and turning off the IR lighting based on the brightness difference being less than or equal to a first threshold value.

Based on the image being acquired with the IR lighting off, the method may include: determining a brightness of an entire area of the image; turning on the IR lighting based on the brightness of the entire area being less than or equal to a second threshold value; and controlling the transmittance of the electrochromic device based on the brightness of the entire area.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software including one or more instructions that are stored in a storage medium (e.g., the memory (not shown) of FIG. 1) that is readable by a machine (e.g., the electronic device 100). For example, a processor (e.g., the processor (not shown) of FIG. 1) of the machine (e.g., the electronic device 100) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product.

The computer program product may be traded as a product between a seller and a buyer (or purchaser described herein). The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a camera;
an infrared (IR) lighting;
an electrochromic device;
at least one processor comprising processing circuitry; and
at least one memory configured to store instructions,
wherein, the instructions, when executed by the at least one processor individually and/or collectively, cause the electronic device to:
acquire a first image frame using the camera;
turn off the IR lighting, in response to the IR lighting being on;
acquire a second image frame using the camera while the IR lighting is off; and
when the first image frame is acquired with the IR lighting on, control a transmittance of the electrochromic device based on a brightness of the second image frame, determine a brightness difference between a brightness of the first image frame and the brightness of the second image frame, and in response to the brightness difference being greater than or equal to a first threshold value, turn on the IR lighting.

2. The electronic device of claim 1, wherein the instructions, when executed by the at least one processor, cause the electronic device to:
in response to the brightness of the second image frame being less than or equal to a second threshold, turn on the IR lighting.

3. The electronic device of claim 1, wherein the instructions, when executed by the at least one processor, cause the electronic device to:
control the transmittance of the electrochromic device to decrease as the brightness of the second image frame increases.

4. The electronic device of claim 1, wherein the instructions, when executed by the at least one processor, cause the electronic device to:
control the transmittance of the electrochromic device to decrease as the brightness difference increases.

5. The electronic device of claim 1, wherein the instructions, when executed by the at least one processor, cause the electronic device to:
when the first image frame is acquired with the IR lighting off, turn off the IR lighting in response to the brightness of the first image frame being greater than or equal to a second threshold value.

6. The electronic device of claim 5, wherein the instructions, when executed by the at least one processor, cause the electronic device to:
when the first image frame is acquired with the IR lighting off, control the transmittance of the electrochromic device based on the brightness of the first image frame.

7. The electronic device of claim 5, wherein the instructions, when executed by the at least one processor, cause the electronic device to:
when the first image frame is acquired with the IR lighting off, control the transmittance of the electrochromic device based on the brightness of the second image frame.

8. A method of controlling an electronic device comprising an electrochromic device, comprising:
acquiring a first image frame using a camera of the electronic device;
in response to an infrared (IR) lighting of the electronic device being on, turning off the IR lighting;
acquiring a second image frame using the camera while the IR lighting is off; and
when the first image frame is acquired with the IR lighting on, controlling a transmittance of the electrochromic device based on a brightness of the second image frame, determining a brightness difference between a brightness of the first image frame and the brightness of the second image frame, and in response to the brightness difference being greater than or equal to a first threshold value, turning on the IR lighting.

9. The method of claim 8, further comprising:
in response to the brightness of the second image frame being less than or equal to a second threshold, turning on the IR lighting.

10. The method of claim 8, further comprising:
controlling the transmittance of the electrochromic device to decrease as the brightness of the second image frame increases.

11. The method of claim 8, wherein the controlling of the transmittance of the electrochromic device based on the brightness difference comprises:

controlling the transmittance of the electrochromic device to decrease as the brightness difference increases.

12. The method of claim 8, wherein when the first image frame is acquired with the IR lighting off, further comprising:
turning on the IR lighting in response to a brightness of the first image frame being greater than or equal to a second threshold value.

13. The method of claim 12, wherein when the first image frame is acquired with the IR lighting off, further comprising:
controlling the transmittance of the electrochromic device based on the brightness of the first image frame.

14. The method of claim 12, wherein when the first image frame is acquired with the IR lighting off, further comprising:
controlling the transmittance of the electrochromic device based on the brightness of the second image frame.

15. A method of controlling an electronic device comprising an electrochromic device, comprising:
acquiring an image using a camera of the electronic device; and
when the image is acquired while an infrared (IR) lighting of the electronic device is on, controlling a transmittance of the electrochromic device based on a brightness of a first area in the image not affected by the IR lighting, determining a brightness difference between the brightness of the first area and a brightness of a second area in the image affected by the IR lighting, and in response to the brightness difference being less than or equal to a first threshold value, turning off the IR lighting.

16. The method of claim 15, wherein when the image is acquired with the IR lighting off, further comprising:
determining a brightness of an entire area of the image;
turning on the IR lighting in response to the brightness of the entire area being less than or equal to a second threshold value; and
controlling the transmittance of the electrochromic device based on the brightness of the entire area.

17. A non-transitory computer-readable storage medium storing instructions that, when executed by a processor, cause the electronic device to perform the operations of claim 8.

* * * * *